C. E. EVERETT.
TIRE VULCANIZER.
APPLICATION FILED NOV. 8, 1920.
1,389,821.
Patented Sept. 6, 1921.
2 SHEETS—SHEET 1.
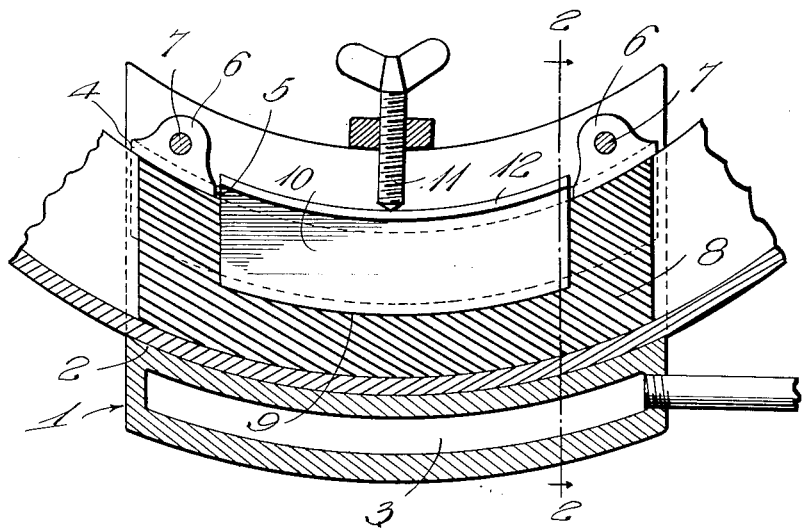
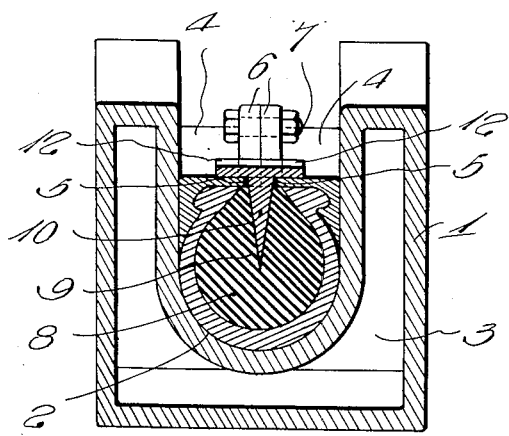
Witness
J. P. Peirce
Inventor
C. E. Everett
By H. B. Willson & Co.
Attorneys

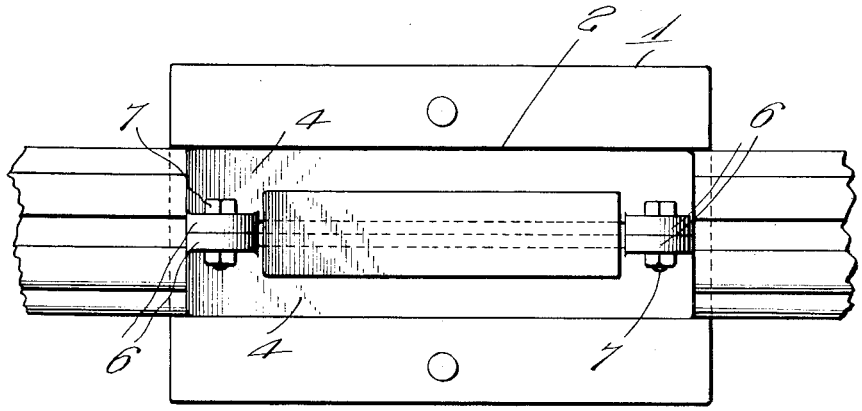
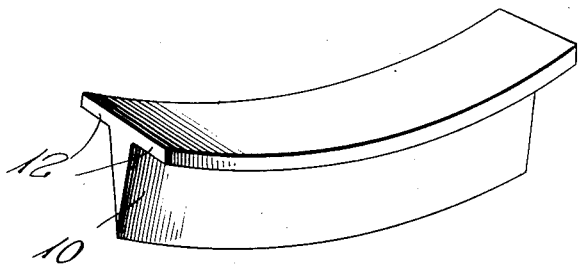
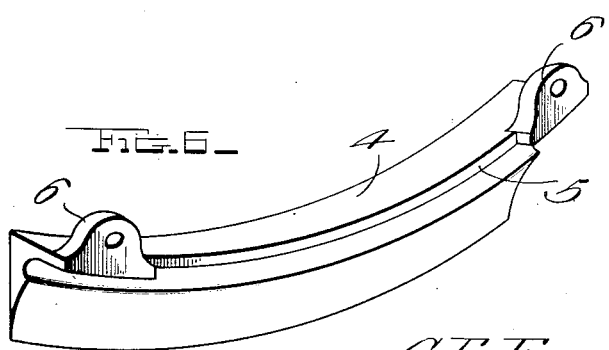

UNITED STATES PATENT OFFICE.

CLARENCE E. EVERETT, OF MILWAUKEE, WISCONSIN.

TIRE-VULCANIZER.

1,389,821.  Specification of Letters Patent.  Patented Sept. 6, 1921.

Application filed November 8, 1920. Serial No. 422,616.

*To all whom it may concern:*

Be it known that I, CLARENCE E. EVERETT, a citizen of the United States, residing at Milwaukee, in the county of Milwaukee and State of Wisconsin, have invented certain new and useful Improvements in Tire-Vulcanizers; and I do declare the following to be a full, clear, and exact description of the invention, such as will enable others skilled in the art to which it appertains to make and use the same.

My invention relates to improvements in tire vulcanizing devices and more particularly to those intended for use in tire repairing, the principal object of my invention being to provide an extremely simple and inexpensive, yet a highly efficient and reliable expansible core to take the place of the usual pneumatic cores or air bags now used in vulcanizing devices.

In carrying out the above, a further object is to provide a core of solid rubber or other elastic compressible material and to provide a wedge for expanding said core in a tire to be vulcanized, the arrangement being such that the core will be compressed at opposite sides of the wedge, thereby insuring tight pressure of the tire against the mold, thus eliminating any danger of the green rubber overflowing from the mold and consequently insuring that the density of the patch shall be greater than when an air bag is used.

Another object is to provide a construction in which the usual clamping screw for holding the bead clamp of the vulcanizer in place, acts also to force the wedge into the core, as well as to force said bead clamp and wedge bodily toward the bottom of the mold so as to hold the tire tightly against the same.

With the foregoing in view, the invention resides in the novel construction and arrangement of parts hereinafter described and claimed, the descriptive matter being supplemented by the accompanying drawings.

Figure 1 is a central vertical longitudinal section through a tire vulcanizer embodying my improvements.

Fig. 2 is a vertical transverse section taken on line 2—2 of Fig. 1.

Fig. 3 is a perspective view of the core in its normally contracted condition.

Fig. 4 is a plan view of the parts shown in Fig. 1, the usual clamp being omitted.

Fig. 5 is a perspective view of the wedge used for expanding the core.

Fig. 6 is a perspective of one section of the bead clamp.

In the drawings above briefly described, the numeral 1 designates a well known form of vulcanizing mold which is provided with a tire receiving channel 2 and a steam jacket 3. Insertible into the channel 2 is a bead clamp of usual construction, with the exception that its two halves 4 are jointly recessed at their meeting edges to provide a longitudinal slot 5 which is here shown extending between the usual ears 6 at the ends of the clamp, said ears being secured together by bolts 7 in the usual manner.

Receivable in the tire to be vulcanized, is a core 8 of rubber or any other appropriate elastic compressible material, said core being provided with a longitudinal split 9 adapted to register with the slot 5. A wedge 10 is insertible into the split 9 through the aforesaid slot 5, whereby to laterally expand the core and compress the portions at opposite sides of the split, so as to effectively hold the tire casing against the sides of the mold. The usual clamping screw 11 is employed for holding the tire down against the bottom of the mold and instead of this clamping screw acting against the bead clamp as in the usual vulcanizer, it thrusts downwardly on the wedge 10 as seen in Fig. 1. The screw in question thus serves to force the wedge into the split 9 to expand the core 8 and when maximum expansion has taken place, shoulders 12 on the butt edge of the wedge strike the bead clamp whereby further action of the screw will bodily move the wedge and bead clamp downwardly to vertically compress the core 8 and thereby hold the tire casing down tight against the bottom of the mold.

By constructing the device in or substantially in the manner shown and described, it will be highly advantageous and will be greatly desirable over the air bags or pneumatic cores now commonly used in tire vulcanizing. The core 8 and wedge 10 will be more economical in use due to the comparatively long life of the former and to the fact that no time will be wasted by inflation, as with the ordinary air bags. Furthermore, greater pressure may be created to hold the tire casing against the bottom and sides of the mold, than can be obtained by the use of an air bag. It thus follows that overflow of the green rubber is prevented and that the density of the patch when completely vulcanized, will be much greater than with the tire vulcanizers now commonly used. This is highly advantageous since the wearing qualities of rubber increase with its density. By holding the tire so tightly against the mold that none of the green rubber can escape at the sides of the tire, it is not necessary to trim off ragged edges of rubber from the sides of the tire, nor to scrape, abrade, or otherwise refinish the aforesaid sides. A great deal of expense is thus eliminated from the process of vulcanizing, and in addition the improved vulcanizer requires no attention while the work is curing, since there is no danger whatever of the core 8 losing its efficiency, whereas the ordinary air bag is very apt to blow out. Moreover, these air bags are short lived, due to successive exposure to heat, but with a solid body of rubber no injury results which will impair the efficiency of the device.

Since probably the best results may be obtained from the details disclosed, such details may be followed if desired, but I wish it understood that within the scope of the invention as claimed, numerous changes may well be made, the present disclosure being for illustrative purposes only.

I claim:

1. A tire vulcanizer comprising a tire receiving mold, a core of elastic compressible material for reception in the tire, and means for exerting transverse pressure on said core and thereby laterally expanding the same.

2. A tire vulcanizer comprising a tire receiving mold, a core of elastic compressible material for reception in the tire, said core having a longitudinal split, and means insertible in said split to laterally expand said core and simultaneously compress the portions thereof at opposite sides of the split.

3. A tire vulcanizer comprising a tire receiving mold, a core of elastic compressible material for reception in the tire, said core having a longitudinal split, and a wedge insertible into split to laterally expand said core and simultaneously compress the portions thereof at opposite sides of the split.

4. A tire vulcanizer comprising a tire receiving mold, a bead clamp insertible into said mold to hold the tire beads in proper relation, said bead clamp having a longitudinal slot, a core of elastic compressible material for reception in the tire, said core having a longitudinal split for registering with the aforesaid slot, and means insertible into said split through said slot for laterally expanding said core.

5. A tire vulcanizer comprising a tire receiving mold, a bead clamp insertible into said mold to hold the tire beads in proper relation, said bead clamp having a longitudinal slot, a core of elastic compressible material for reception in the tire, said core having a longitudinal split for registration with the aforesaid slot, and a wedge insertible into said split through said slot for laterally expanding said core.

6. A tire vulcanizer comprising a tire receiving mold, a bead clamp insertible into said mold to hold the tire beads in proper relation, said bead clamp having a longitudinal slot, a core of elastic compressible material for reception in the tire, said core having a longitudinal split for registration in the aforesaid slot, a wedge insertible into said split through said slot, and having a shoulder adapted to rest on said bead clamp, and means acting on said wedge for forcing the same into the core until said shoulder strikes said clamp, and for then bodily moving said clamp and wedge toward the bottom of the mold.

7. A core for tire vulcanizers comprising an elongated body of elastic compressible material adapted to be received in a tire, said core having a longitudinal split opening through one side to receive expanding means.

8. An article of manufacture comprising a longitudinally curved wedge conforming to the curvature of a vehicle tire and adapted to expand a core in a vulcanizer, the butt edge of said wedge having a laterally extending stop shoulder to bear against the usual bead clamp of the vulcanizer.

In testimony whereof I have hereunto set my hand.

CLARENCE E. EVERETT.